United States Patent Office

Re. 27,004
Reissued Dec. 15, 1970

27,004

PROCESS FOR THE PREPARATION OF CARBONYL COMPOUNDS CONTAINING A HINDERED PHENOL GROUP

Eric A. Meier, North Brunswick, N.J., and Martin Dexter, Briarcliff Manor, N.Y., assignors to Geigy Chemical Corporation, Greenburgh, N.Y., a corporation of Delaware No Drawing. Original No. 3,247,240, dated Apr. 19, 1966, Ser. No. 164,619, Jan. 5, 1962. Application for reissue Aug. 17, 1966, Ser. No. 576,173

The portion of the term of the patent subsequent to Feb. 18, 1981, has been disclaimed Int. Cl. C07c *39/02, 69/76, 103/26*

U.S. Cl. 260—473 14 Claims

Matter enclosed in heavy brackets [ ] appears in the original patent but forms no part of this reissue specification; matter printed in italics indicates the additions made by reissue.

This invention relates to a novel and useful process for the preparation of certain 3,5-dialkyl-4-hydroxyphenyl organic compounds. In particular, the invention concerns the preparation of compounds of the Formula I:

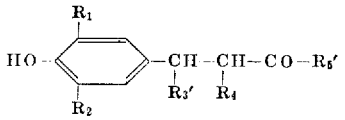

(I)

wherein $R_1$ is a secondary or a tertiary alkyl group, preferably the tertiary (t or tert.) butyl group; other groups possible are, e.g., the isopropyl group, secondary (sec.) or tert. alkyl groups of 4 to 24 carbon atoms: butyl, amyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl tricosyl, tetracosyl, etc., $R_2$ is an alkyl group, preferably the tertiary butyl group; other groups possible are alkyl groups of 1 to 24 carbon atoms: methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, etc.

$R_3'$ and $R_4'$ are each independently hydrogen, alkyl, aryl—especially phenyl, acenaphthyl and naphthyl—alkaryl—especially alkylphenyl and polyalkylphenyl—aralkyl—especially benzyl—and carbalkoxy and $R_5$ is alkoxy, alkyl thioalkyloxy or alkyloxyalkyloxy amino alkylamino, dialkylamino, alkyl, aryl—especially phenyl, acenaphthyl or naphthyl—alkylaryl, arylalkyl, hydrogen and the group

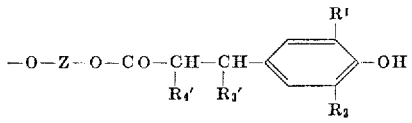

wherein Z is a straight or branched alkylene group, and $R_1$, $R_2$, $R_3'$ and $R_4'$ have the means described hereinabove.

The 3,5-dialkyl-4-hydroxyphenyl substituted organic compounds of the Formula I are used as stabilizers for organic material normally subject to deterioration caused by heat, light, oxygen, ozone, and other physical and/or chemical forces tending to cause degradation, embrittlement, gum or sludge formation, discoloration and other undesirable effects in a variety of organic materials, e.g., lubricating oils and fuel oils, and in general, oils of mineral, vegetable or animal origin, waxes, soaps, greases, gasoline, natural and synthetic rubbers, resins, and plastics, such as polymers of hydrocarbons, e.g. ethylene and propylene, etc.

An object of this invention is to provide a novel chemical process for preparing the compounds of the Formula I. A further object is to provide a process which comprises contacting a 3,5-dialkyl-4-hydroxybenzene compound, suitable to yield a derivative of the Formula I above, with an appropriate compound of the Formula III (hereinbelow) in the presence of a base catalyst and a solvent, such as a difficulty esterifiable alcohol, to yield the desired organic compound of the Formula I. The difficulty esterifiable alcohol is preferably a lower alkanol, especially a tertiary lower alkanol e.g. t-butanol, t-pentanol, t-hexanol, t-heptanol, t-octanol. In this specification "lower" alkanols have up to 8 carbon atoms. Other objects of this invention will be apparent from the description and specification which follows.

It has now surprisingly been found that the foregoing objects of the invention are realized by the process which comprises reacting a compound of the Formula II:

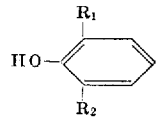

(II)

wherein $R_1$ and $R_2$ are defined as hereinabove, with a further compound of the Formula III:

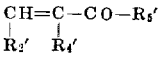

(III)

wherein $R_3'$, $R_4'$ and $R_5'$ are defined as above, the reaction to be carried out in the presence of a base catalyst such as a quaternary ammonium base, e.g. benzyltrimethylammonium methoxide or such as alkali metal amides, e.g., sodamide, or alkali metal alkoxides—preferably an alkali metal lower alkoxide, e.g., sodium or potassium methoxide, ethoxide, n-propoxide, isopropoxide, n-butoxide, sec.-butoxide, t-butoxide, pentoxide, hexoxide, heptoxide, octyloxide, etc., or alkali metal hydroxides, e.g., sodium or potassium hydroxide. The alkaline earth metal alkoxides or hydroxides are also useful.

The Compounds II and III and the base catalyst are reacted in a suitable solvent which can be either one of the reacting Compounds II or III which may or may not be present in equimolar amounts, or an auxiliary solvent which may be an aliphatic alcohol, preferably a difficulty esterifiable alcohol such as a tertiary alkanol, e.g., tertiary butanol, or an ether type solvent such as tetrahydrofuran, or a suitable amide such as dimethyl formamide, or a suitable ketone, such as acetone.

Compounds of the Formula II are prepared by alkylation of phenol and by other known methods. Certain compounds of the Formula II are available commercially, e.g. 2,6-di-tert.-butylphenol. Examples of the compounds of the Formula II which are useful are the following:

6-t-butyl-o-cresol,
6-(1,1,3,3-tetromethylbutyl)o-cresol,
2-sec-butyl-6-t-butylphenol,
2,6-bis(1,1-dimethyl-n-propyl)phenol
2,6-bis(1-methyl-n-nonyl)phenol,
2-(1,1,3,3-tetramethyl-n-butyl)-6-methylphenol, etc.

Compounds of the Formula III are prepared by suitable esterification and amidation of sutiable acrylic acid derivatives, methacrylic acid derivatives and other suitable substituted acrylic acid derivatives. Compounds of the Formula III are also available in some cases commercially.

A wide range of temperatures from 25° C. (at atmospheric pressure) to 200° C. (at elevated pressures) may be employed to bring about the desired addition. The preferred range of temperatures is 40° to 110° C.

The reaction may be conducted at 1:1 molar concentrations of the two reactants II and III. Large excesses of the activated olefin III should be avoided in order to prevent side reactions.

Any suitable catalyst concentrations, e.g., from 0.01 to 100 mole percent, based on the phenol (II) concentration, may be employed, though preferred are mole percents of 5 to 25%.

Any suitable mode of addition may be employed although it has been found most practical to add the activated olefin in III last to prevent its homopolymerization particularly at elevated temperatures.

Optimum results are obtained when air or oxygen is excluded or substantially reduced in amount from the atmosphere immediately in contact with the reactants. This can be accomplished in various ways, e.g., by blanketing the reactants in the reaction vessel with an inert gas such as nitrogen. Alternatively, a reaction vessel is chosen whereby the reactants, solvent, catalyst, etc. substantially fill the vessel. In a reaction in a closed vessel, air may be swept out with an inert gas such as nitrogen before introducing the reactants, etc. into the reaction vessel.

Preferred products produced according to the process of the invention are compounds of the Formula I(a):

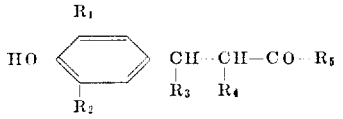

(Ia)

wherein $R_1$ and $R_2$ are defined as hereinabove, $R_3$ and $R_4$ are each independently hydrogen, or carbalkoxy—especially carbalkoxy having 2 to 24 carbon atoms, e.g., carbomethoxy, carboethoxy, carbopropoxy, carbobutoxy, carbopentoxy, carbohexoxy, carboheptoxy, carbooctyloxy, carbononyloxy, carbodecyloxy, carboundecyloxy, carbododecyloxy, carbotridecyloxy, carbotetradecyloxy carbopentadecyloxy, carbohexadecyloxy, carboheptadecyloxy, carbooctadecyloxy, carbononadecyloxy, carboeicosyloxy, carboheneicosyloxy, carbodocosyloxy, carbotricosyloxy, carbotetracosyloxy—hydrogen being preferred for $R_4$.

$R_5$ is alkoxy—especially alkoxy having 1 to 24 carbon atoms, e.g., methoxy, ethoxy, propoxy, butoxy, pentoxy, hexoxy, heptoxy, octyloxy, nonyloxy, decyloxy, undecyloxy, dodecyloxy, tridecyloxy, tetradecloxy, pentadecyloxy, hexadecyloxy, heptadecyloxy, octadecyloxy, nonadecyloxy, eicosyloxy, heneicosyloxy, docosyloxy, tricosyloxy, tetracosyloxy—amino, alkylamino—especially having 1 to 24 carbon atoms, e.g. methylamino, ethylamino, propylamino, butylamino, pentylamino, hexylamino, octylamino, nonylamino, decylamino, undecylamino, dodecylamino, tridecylamino, tetradecylamino, pentadecylamino, hexadecylamino, heptadecylamino, octadecylamino, nonadecylamino, eicosylamino, heneicosylamino, docosylamino, tricosylamino, tetracosylamino—and the group

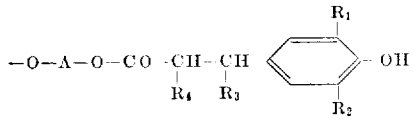

wherein A is a straight or branched chain alkylene group, particularly an alkylene group having 1 to 6 carbon atoms, most particularly the ethylene group, and $R_1$, $R_2$, $R_3$ and $R_4$ are defined the same as hereinabove.

The compounds of the Formula I(a) are preferably produced by the process which comprises reacting a compound of the Formula II with a compound of the Formula III(a):

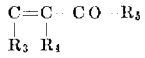

(III(a))

wherein $R_3$, $R_4$ and $R_5$ are as defined hereinabove, the reaction to be carried out in the presence of a base catalyst—preferably potassium tertiary butoxide or potassium hydroxide—and the reaction to be effected either with, or without, a suitable solvent—preferably tertiary butanol as solvent, and then recovering the so obtained product compound of the Formula I(a).

In another aspect of this invention, it has now been found that the novel compounds of the Formula IV:

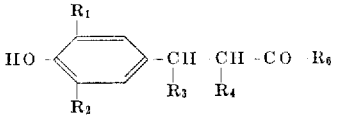

(IV)

wherein $R_1$, $R_2$, $R_3$ and $R_4$ are defined as herein above, and $R_6$ is an alkyl group, especially an alkyl group having 1 to 24 carbon atoms therein as illustrated in Example VII hereinbelow, are useful stabilizers for unstable organic material, e.g., hydrocarbon oils, lubricating and fuel oils, plastic materials such as polypropylene and polyethylene, etc. as described hereinabove.

In a further aspect of this invention it has now been found that there are likewise useful as stabilizers for unstable organic material, e.g., mineral oils, polypropylene, etc.—as described hereinabove—the novel compounds of the Formula V:

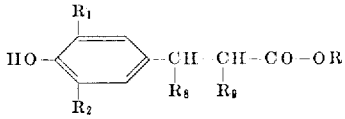

(V)

wherein $R_1$ and $R_2$ are the same as defined hereinabove, $R_8$ and $R_9$ are each independently hydrogen or carbalkoxy, especially lower carbalkoxy, e.g., carbomethoxy, carboethoxy, carbopropoxy, carbobutoxy, carbopentoxy, carbohexoxy; the most preferred embodiments of $R_8$ and $R_9$ being those wherein one of $R_8$ and $R_9$ is lower carbalkoxy and the other is hydrogen, and $R_7$ is an alkyl group, e.g., an alkyl group of 1 to 24 carbon atoms, preferably a lower alkyl group, i.e., methyl, ethyl, propyl, butyl, pentyl, hexyl.

The following examples illustrate the invention but are not meant to limit the same thereto; in said examples, unless otherwise indicated, parts are by weight and the relationship between parts by weight and parts by volume is as that of grams to cubic centimeteres; temperatures are in degrees centigrade.

Example I.—Preparation of methyl β-(3,5-di-tertiary butyl-4-hydroxyphenyl)propionate via potassium metal To 500 parts by volume of dry tertiary butyl alcohol contained in a suitable flask (fitted with mechanical stirrer, inert gas inlet, thermometer, condenser and dropping funnel) is added 2.1 parts of potassium metal. After the ensuing reaction is complete there is added 37.3 parts of 2,6-di-tertiary butyl phenol followed by 17.7 parts of methylacrylate rapidly in that order. The stirred reaction mixture is heated to 50° for 18 hours and allowed to cool. The solvent is removed under reduced pressure and the residual mass neutralized with diluted hydrochloric acid and extracted two times with 200 parts by volume portions of ethyl ether. The combined ethereal extracts are washed two times with 100 part by volume portions of water and dried over anhydrous sodium sulfate. The ether layer is then removed via filtration and concentrated on the steam bath. The residual oily mass is then vacuum distilled collecting the fraction boiling from 125–130° at 0.1 mm. Hg pressure. On standing, the pale yellow oil crystallizes to a solid product, methyl β(3,5-di-tert. butyl-4-hydroxyphenyl)propionate of melting point 63.0–64.5°. Recrystallization from hexane yields a white solid of melting point 66.0–66.5°.

Analysis:

| | C | H | Saponification equivalent |
|---|---|---|---|
| Calculated for $C_{18}H_{28}O_3$ | 73.93 | 9.65 | 292.4 |
| Found | 74.27 | 9.90 | 292±10 |

In a similar way, the corresponding alkyl esters are obtained from the respective alkyl acrylates: ethyl, propyl, butyl, amyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, etc.

If in Example I there is substituted for potassium tertiary butoxide catalyst either benzyltrimethylammonium methoxide or sodamide, then the desired product is obtained.

Example II.—Preparation of methyl β-(3,5-di-tertiary butyl-4-hydroxyphenyl)propionate via potassium hydroxide The reaction conditions are the same as those employed in Example I with the exception that a slurry of 3.5 parts of potassium hydroxide in 500 parts by volume of tertiary butyl alcohol is used in the place of potassium (as the alcoholate) as the base catalyst. A somewhat lower yield of the product ester is realized by this method.

Example III.—Preparation of dodecyl β-(3,5-di-tertiary-butyl-4-hydroxyphenyl)propionate To 500 parts by volume of dry tertiary butyl alcohol is added 2.2 parts of potassium metal. Upon completion of the ensuing reaction there is added 44.6 parts of 2,6-di-tertiary butyl phenol and 57.9 parts of lauryl acrylate in rapid succession. The resulting system is heated to reflux for six hours and then allowed to cool. The solvent is then removed under reduced pressure and the residual mass neutralized with very dilute hydrochloric acid. The reaction mixture is extracted two times with 300 parts by volume portions of 1:1 ethyl ether: petroleum ether and the combined extracts with two 100 parts by volume portions of water. The extract is then dried over anhydrous sodium sulfate, the drying agent filtered off, and the ethereal solution concentrated to a final temperature of 200° at a pressure of 0.1 mm. Hg. The product, dodecyl β-(3,5-di-tertiary butyl-4-hydroxyphenyl) propionate, a viscous residue is analyzed.

Analysis:

| | C | H |
|---|---|---|
| Calculated for $C_{29}H_{50}O_3$ | 78.1 | 11.3 |
| Found | 77.90 | 11.48 |

Example IV.—Preparation of diethyl α-(3,5-di-tertiary butyl-4-hydroxyphenyl)succinate To 500 parts by volume of dry tertiary butyl alcohol is added 2.1 parts of potassium metal. Upon completion of the reaction 45.9 parts of 2,6-di-tertiary butyl phenol followed by 41.7 parts of diethyl maleate are rapidly added. The resulting system is refluxed for 20 hours and then allowed to cool. The reaction mixture is concentrated under reduced pressure to remove most of the solvent and then neutralized with diluted hydrochloric acid. The resulting mass is then extracted with two times 200 parts by volume portions of ether and the combined ethereal solutions with two times 100 parts by volume portions of water. The ethereal solution is then dried over anhydrous sodium sulfate and then concentrated on the steam bath. The residual oil is distilled collecting the fraction boiling from 164–174° under 0.1 mm. Hg pressure. The product, diethyl α-(3,5-di-tertiary butyl-4-hydroxyphenyl)succinate, crystallizes on standing to a low melting solid.

Analysis:

| | C | H |
|---|---|---|
| Calculated for $C_{22}H_{34}O_5$ | 69.81 | 9.05 |
| Found | 69.78 | 9.26 |

If in Example IV other dialkyl maleate esters are employed, then the respective dialkyl succinate derivatives are obtained: methyl, propyl, butyl, amyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, etc.

Example V.—Preparation of β-(3,5-di-tertiary butyl-4-hydroxyphenyl)propionamide

To a solution prepared by reaction 2.0 parts of potassium metal with 500 parts by volume of dry tertiary butanol is added 21 parts of acrylamide followed by 38.2 parts of 2,6-di-tertiary butyl phenol. The resulting system is refluxed for 24 hours and allowed to cool. The excess solvent is removed under reduced pressure and the residue neutralized with diluted hydrochloric acid. The mass is then extracted with two times 200 parts by volume of ether and the combined ethereal extracts with copious amounts of water. The ethereal layer is then dried over anhydrous sodium sulfate and concentrated on the steam bath. To the viscous residue is added 160 parts by volume of petroleum ether and the precipitated crude product is filtered off. After several recrystallizations the product, β-(3,5-di-tertiary butyl-4-hydroxyphenyl) propionamide, melts at 152.5–153.5°.

Analysis:

| | C | H | N |
|---|---|---|---|
| Calculated for $C_{17}H_{27}O_2$ | 73.60 | 9.81 | 5.05 |
| Found | 73.91 | 10.10 | 5.06 |

If in the preceding Example V, 29.3 parts of N,N-dimethylacrylamide is substituted for 21 parts of acrylamide, then there is obtained N,N-dimethyl-β-(3,5-di-tertiary butyl-4-hydroxyphenyl)propionamide.

Likewise, other N,N-dialkylacrylamides are employed to yield the corresponding N,N-dialkyl propionamide derivatives: ethyl, propyl, butyl, amyl, hexyl, heptyl, octyl, nonyl, decyl, undecyl, dodecyl, tridecyl, tetradecyl, pentadecyl, hexadecyl, heptadecyl, octadecyl, nonodecyl, eicosyl, heneicosyl, docosyl, tricosyl, tetracosyl, etc. In similar fashion, also, the N-nonoalkyl amides of 1 to 24 carbon atoms in the alkyl group are prepared from the corresponding N-alkylacrylamide. Examples of such alkyl groups are the same as for the N,N-dialkylacrylamides above. See, for example, Example VIII.

Example VI.—Preparation of n-octadecyl β-(3,5-di-tertiary butyl-4-hydroxyphenyl)propionate To a solution prepared by adding 2.0 parts of potassium metal to 500 parts by volume of dry tertiary butyl alcohol and allowing the reaction to go to completion is added 36.5 parts of 2,6-di-tertiary butyl phenol followed by a slurry of 58.4 parts of octadecyl acrylate in 350 parts by volume of tertiary butyl alcohol. The resulting system, which becomes homogeneous on heating is maintained at reflux for 48 hours. The solvent is removed under reduced pressure and the residual mass is neutralized with very dilute hydrochloric acid. The mass is then extracted several times with 200 parts by volume portions of ether and the combined ethereal extracts with several 50 parts by volume portions of water. The ethereal solution is dried over anhydrous sodium sulfate and concentrated on the steam bath. The crude product is recrystallized from methanol: ethyl acetate several times to yield a white crystalline product n-octadecyl β-

(3,5-di-tertiary butyl-4-hydroxyphenyl)propionate, whose melting point is 49–50° (uncorrected).

Analysis:

| | C | H | Saponification equivalent |
|---|---|---|---|
| Calculated for $C_{36}H_{62}O_3$ | 79.18 | 11.77 | 530.9 |
| Found | 79.78 | 11.77 | 526.6 |

Example VII.—Preparation of 4-(3′5′-di-tertiary butyl-4′-hydroxyphenyl)butan-2-one To a solution prepared by reacting 1.2 parts of potassium metal with 250 parts by volume of tertiary butyl alcohol is added 46.6 parts of 2,6 - di - tertiary butyl phenol. To this stirred solution is added dropwise 26.8 parts of methyl vinyl ketone at such a rate as to keep the temperature below 65°. After addition is complete the reaction mass is heated at 50° for 16 hours and then allowed to cool to room temperature. The excess methyl vinyl ketone and solvent are distilled off under reduced pressure. The residue is neutralized with very dilute hydrochloric acid and extracted with two times 200 parts by volume portions of ether. The combined ethereal layers are washed with 2 times 100 parts by volume por-anhydrous sodium sulfate and then concentrated on the steam bath. The residual mass is then vacuum distilled collecting the fraction boiling from 137–139°/0.05 mm. Hg pressure. On prolonged standing the product 4-(3′,5′-di-tertiary butyl - 4′-hydroxyphenyl)butane-2-one crystallizes.

If in the preceding Example VII, 109 parts of octadecyl vinyl ketone are substituted for 26.8 parts of methyl vinyl ketone, then there is obtained β-(3,5-di-tertiary butyl-4-hydroxyphenyl)-ethyl octadecyl ketone. Other substituted ethyl alkyl ketones are prepared in a similar way when the respective alkyl vinyl ketone is employed: ethyl, propyl, butyl, amyl, hexyl, heptyl, octyl, nonyl, decyl, undecyl, dodecyl, tridecyl, tetradecyl, pentadecyl, hexadecyl, heptadecyl, nonadecyl, eicosyl, docosyl, tricosyl, tetracosyl, etc.

Example VIII.—Preparation of N-(n-octadecyl)-β-(3,5-di-tertiary butyl-4-hydroxyphenyl)propionamide tions of water. The ethereal layer is then dried over To a solution prepared by reacting 2 parts of potassium metal with 500 parts by volume of dry tertiary butyl alcohol is added 41.2 parts of 2,6-di-tertiary butyl phenol and 64.7 parts of N-octadecylacrylamide rapidly in that order. The resulting system is refluxed for 72 hours and then allowed to cool. The excess solvent is removed under reduced pressure and the residual mass neutralized with very dilute hydrochloric acid. The mass is then extracted with 200 parts by volume portions of ether and petroleum ether respectively and the combined extracts washed with two 50 parts by volume portions of ether. The organic layer is then dried over anhydrous sodium sulfate, filtered, and concentrated to a thick mass. Recrystallization with methanol yields the desired product, N - (n-octadecyl)-β-(3,5-di-tertiary butyl-4-hydroxyphenyl)propionamide, as a waxy solid, M.P. 82–84°.

Analysis:

| | C | H | N |
|---|---|---|---|
| Calculated for $C_{35}H_{63}O_2N$ | 79.33 | 11.98 | 2.64 |
| Found | 79.04 | 11.78 | 2.90 |

Eaxmple IX.—Preparation of ethylene bis-[3,5-di-tertiary butyl-4-hydroxyphenyl)propionate]

To a solution prepared by reacting 2 parts of potassium metal with 500 parts by volume of tertiary butyl alcohol is added 49 parts of 2,6-di-tertary butyl phenol followed by 16.8 parts of ethylene bis acrylate rapidly in that order. The resulting system is heated to reflux for 8 hours and cooled and the excess solvent removed under reduced pressure. The residual mass is neutralized with dilute hydrochloric acid and extracted with two 200 parts by volume portions of ether. The ethereal solution is washed with water and then dried over anhydrous sodium sulfate. The drying agent is removed via filtration and the ethereal solution evaporated to dryness on the steam bath. The resultant solid mass is recrystallized from ethanol-water mixtures to yield the desired compound, ethylene bis-[β-(3,5-di-tertiary butyl - 4 - hydroxy phenyl)propionate], M.P. 145.5–147° (uncorrected).

Example X.—Preparation of methyl β-(3,5-di-tertiary butyl - 4 - hydroxyphenyl)propionate without auxillary solvent To 169.5 parts of molten 2,6-di-tertiary butyl phenol under nitrogen in a similar apparatus as described in Example 1 is rapidly added 4.9 parts of sodium methylate. To the stirred system is added dropwise 78.8 parts of methyl acrylate over a 20 minute period. After the exothermic reaction subsides the reaction mixture is heated for an additional 3 hours at 60°. The product, methyl β - (3,5 - di - tertiary butyl-4-hydroxyphenyl)propionate, is isolated and purified in the fashion described in Example I, said product after crystallization, melting at 63–64.5°.

What is claimed is:

1. The process for the preparation of compounds of the formula:

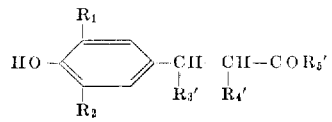

wherein $R_1$ is a member selected from the group consisting of secondary alkyl and tertiary alkyl $R_2$ is alkyl each of $R_3'$ and $R_4'$ is a member selected from the group consisting of hydrogen, alkyl, aryl, alkaryl, aralkyl and carbalkoxy, and $R_5'$ is a member selected from the group consisting of alkoxy, amino, alkylamino, dialkylamino, alkyl, hydrogen and the group

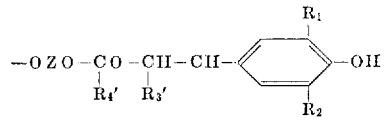

in which Z is alkylene and $R_1$, $R_2$, $R_3'$ and $R_4'$ are as above defined, which comprises treating a compound of the formula:

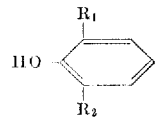

in which $R_1$ and $R_2$ are as above defined with about an equimolar amount of a compound of the formula:

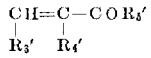

in which $R_3'$, $R_4'$ and $R_5'$ are as above defined, in the presence of from about .05 to about .25 molar equivalent amount of an alkali metal base *or a quaternary ammonium base* and at a temperature from about 25° C. to about 200° C.

2. In the process for the preparation of compounds of the formula:

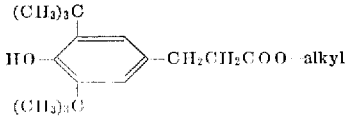

the steps which comprise treating 2,6-di-t-butylphenol with about an equimolar amount of an alkyl acrylate in the presence of from about .05 to about .25 molar equivalent of an alkali metal base *or a quaternary ammonium base* and at a temperature of from about 25° C. to about 200° C.

3. In the process for the preparation of compounds of the formula:

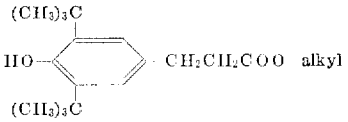

the steps which comprise treating 2,6-di-t-butylphenol with about an equivalent amount of an alkyl acrylate in the presence of from about .05 to about .25 molar equivalent of an alkali metal base *or a quaternary ammonium base* and at a temperature of from about 40° C. to about 110° C.

4. The process according to claim 3 wherein the alkali metal base is an alkali metal hydroxide.

5. The process according to claim 3 wherein the alkali metal base is an alkali metal alkoxide.

6. The process according to claim 4 wherein the process is executed in the presence of t-butanol as a solvent.

7. The process according to claim 5 wherein the process is executed in the presence of t-butanol as a solvent.

8. The process according to claim 4 wherein the alkali metal hydroxide is sodium hydroxide.

9. The process according to claim 4 wherein the alkali metal hydroxide is potassium hydroxide.

10. The process according to claim 5 wherein the alkali metal alkoxide is potassium t-butoxide.

11. The process according to claim 5 wherein the alkali metal alkoxide is sodium methoxide.

12. The process for the preparation of methyl 3-(3,5-di-t-butyl-4-hydroxyphenyl)propionate which comprises treating 2,6-di-t-butylphenol with a substantially equimolar amount of methyl acrylate in the presence of from about .05 to about .25 molar equivalents of an alkali metal alkoxide at a temperature from about 40° C. to about 110° C.

13. The process according to claim 12 wherein the alkali metal alkoxide is potassium t-butoxide.

14. The process according to claim 12 wherein the alkali metal alkoxide is sodium methoxide.

References Cited

The following references, cited by the Examiner, are of record in the patented file of this patent or the original patent.

UNITED STATES PATENTS

| | | | |
|---|---|---|---|
| 2,202,877 | 6/1940 | Stevens et al. | 260—624 |
| 2,208,585 | 7/1940 | Karrer | 260—624 |
| 2,551,926 | 5/1951 | Carney | 260—473 |
| 2,603,662 | 7/1952 | Stevens et al. | 260—624 |
| 2,624,732 | 1/1953 | Hitchings et al. | 260—473 |
| 2,643,268 | 6/1953 | Heinzelmann | 260—590 |
| 2,681,371 | 6/1954 | Gaydasch et al. | 260—624 |
| 2,789,995 | 4/1957 | Johnston | 260—473 |
| 2,831,898 | 4/1958 | Ecke et al. | 260—473 |
| 2,881,219 | 4/1959 | Thompson | 260—624 |
| 2,969,397 | 1/1961 | Guex | 260—590 |
| 3,012,063 | 12/1961 | Roller | 260—473 |
| 3,013,062 | 12/1961 | Richter | 260—473 |

OTHER REFERENCES

Stillson et al., J. Am. Chem. Soc., 67, pp. 303-307 (1945).

LORRAINE A. WEINBERGER, Primary Examiner

D. E. STENZEL, Assistant Examiner

U.S. Cl. X.R.

260—559, 590, 624, 600